United States Patent Office 3,631,147
Patented Dec. 28, 1971

3,631,147
PREPARATION OF MONOCATION SALTS OF N,N,N',N' - TETRAKIS(p-DIALKYL AMINO-PHENYL)-p-PHENYLENEDIAMINES
Peter Vincent Susi, Middlesex, N.J., assignor to American Cyanamid Company, Stamford, Conn.
No Drawing. Filed June 24, 1970, Ser. No. 49,534
Int. Cl. C08f 45/62
U.S. Cl. 260—45.75 R        7 Claims

ABSTRACT OF THE DISCLOSURE

Monocation salts of N,N,N',N'-tetrakis(p-dialkyl aminophenyl)-p-phenylenediamines are prepared in situ in the system where they are to be used, e.g., in a plastic system, by reaction of the corresponding p-quinonediimonium salts with the corresponding unoxidized N,N,N',N'-tetrakis(p-dialkyl aminophenyl)-p-phenylenediamine.

---

This invention relates to a new method of preparation of certain infrared-absorbing, substituted tetraphenyl arylaminium salts. More particularly, it relates to the preparation of these salts in situ in the system where they are to be used. It also relates to the preparation of plastic products of given spectral characteristics containing these salts.

The infrared absorbing salts prepared by this process are monocation salts having the general formula:

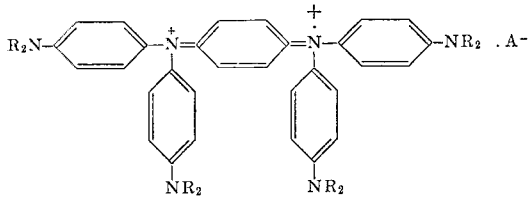

where R is an alkyl group of 3 to 8 carbon atoms and A⁻ is an amino and are formed in situ by reaction of the corresponding p-quinonediimonium salts (dication type) with the corresponding unoxidized N,N,N',N'-tetrakis(p-dialkylaminophenyl)-p-phenylenediamines in a solvent or in a plastic system.

Substituted tetraphenyl arylaminium salts of the monocation type and their use as infrared absorbers are disclosed in U.S. Pat. No. 3,484,467 of P. V. Susi and N. A. Weston. The patent describes the preparation of these compounds by the following method. An N,N,N',N'-tetrakis(p-dialkyl aminophenyl)-p-phenylenediamine is oxidized in an organic solvent solution by reacting the polyamino compound with 1 mole equivalent of a silver salt of a suitable acid. After stirring until the reaction is complete, the mixture is filtered to remove the reduced metal, and the filtrate is slowly diluted with ether or water or some other medium in which the product is not soluble. On cooling, the desired aminium salt precipitates and is collected, washed, and dried. (See also Neunhoffer et al., Chem. Ber. 92 245–51 (1959)).

This method can be applied successfully to the preparation of monocation, substituted tetraphenyl arylaminum salts of the general Formula I given above where R is methyl or ethyl, but it is much less successful when the R group is propyl or higher alkyl. In the latter case, a product is obtained which is a mixture of a dication salt of the general formula:

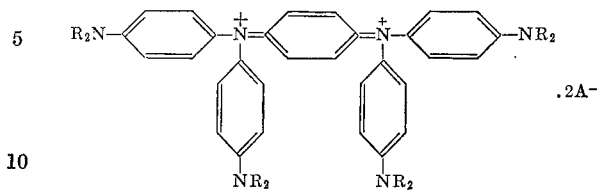

where R is propyl or higher alkyl group and A⁻ is an anion; the desired monocation compound; and unoxidized amine. This is explained partly by the differences in solubility between the monocation and dication compounds in which R is propyl or higher alkyl. There is always a slight tendency for the monocation tetraphenyl arylaminium salt to disproportionate to give the dication oxidation product and unoxidized amine. This disproportionation is negligible in the case of the salts where R is methyl or ethyl, there being little solubility difference between the monocation and dication salts. Since the dicaiton salts of the higher homolgs, however, are less soluble than the monocation salts and thus precipitate from the solution before the mono-cation salts, the undesirable disproporationation is favored for these compounds. Therefore, even though the polyamino compound has been oxidized with the exact amount of oxidant required to form the monocation salt, the pronounced difference in solubility between the monocation and dication products, with the subsequent removal of the dication product from the solution, results in a greater amount of disproportionation and a final product which is a mixture of some of the monocation salt and considerable amounts of dication salt.

The monocation salts may also be isolated from the oxidation mixtures by evaporation to dryness of the filtrates remaining after removal of the precipitated metal. This method, however, is very inconvenient, particularly when working with large quantities.

It has now been found that the monocation, substituted tetraphenyl arylaminium salts of Formula I where R is an alkyl group of 3 to 8 carbon atoms can be prepared in practically pure form in an appropriate solvent or in a plastic system in situ by reaction of a dication, p-quinonediimonium salt of Formula II and at least one equivalent of a polyamino compound of the general formula:

(III)

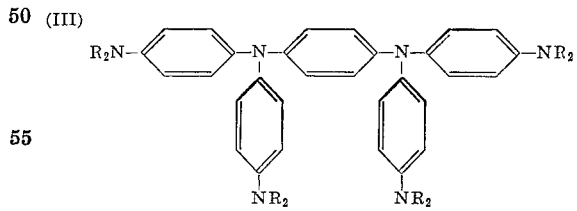

where R is an alkyl group of 3 to 8 carbon atoms.

This improved method of preparation in situ avoids an isolation step and its attendant difficulties, and it makes use of a starting material, the dication p-quinonediimonium salt, which is much easier to obtain in pure form than the desired product. It also provides a very convenient method of making a plastic product with the spectral characteristics conferred by tetraphenyl arylaminium salts of this type.

The following procedure is used to prepare the substituted tetraphenyl arylaminium salts represented by Formula I. A given amount of the desired dication p-quinonediimonium salt represented by Formula II dissolved in an appropriate solvent or in a desired plastic system is treated with at least one equivalent of the corresponding polyamino compound represented by Formula III. The resulting mixture is allowed to stand a few minutes or stirred, if necessary. The dication salt and the amine react rapidly to give almost pure monocation salt as shown by the equation $$X^{++} + X \rightarrow 2X^+$$

where $X^{++}$ represents the dication salt, X represents the unoxidized amine, and $X^+$ represents the monocation salt.

Although use of substantially stoichiometric amounts of the dication salt and amine will give almost pure monocation salt, some excess amine can be used to insure complete conversion of the dication salt to monocation salt. The presence of unreacted amine in the final product will not effect the spectral characteristics of that product, and its presence is usually unobjectionable. However, in some instances, an excess of amine may effect light stability adversely. Conversely, less than an equivalent amount of amine may be used if a product is desired with the spectral characteristics conferred by a mixture of the dication salt and the monocation salt.

The dication, p-quinonediimonium salts used as starting materials are prepared by oxidation of the corresponding polyamino compounds with two equivalents of a silver salt of a suitable acid (See U.S. No. 3,251,881). Thus, dication salts represented by formula II are provided where $A^-$ can be perchlorate ($ClO_4^-$), fluoborate ($BF_4^-$), trichloroacetate ($CCl_3COO^-$), trifluoroacetate $$(CF_3COO^-)$$

picrate $(NO_8)_3C_6H_2O^-)$, hexafluoroarsenate $(AsF_6^-)$, benzenesulfonate $(C_6H_5SO_3^-)$, ethanesulfonate $$(C_3H_5SO_3^-)$$

phsophate ($PO_4^{---}$), sulfate ($SO_4^{--}$), chloride ($Cl^-$) and the like. A particularly convenient salt is that in which $A^-$ is hexafluoroantimonate ($SbF_6^-$). The same anion will then be represented by $A^-$ in the monocation salt of Formula I after reaction has taken place.

The process of this invention is particularly suitable for the preparaiton of substituted tetraphenyl arylaminium salts of the general Formula I where R is a propyl or higher alkyl group because of the difficulty of obtaining such salts by other methods, but it can also be used to prepare the arylaminium salts of Formula I where R is methyl or ethyl if it should be convenient to do so.

As stated before, the preparation of the monocation salts from the dication salts and the unoxidized amines may be carried out in an appropriate solvent or in a plastic system. Appropriate solvents include dimethylformamide and acetone.

The in situ preparation of the monocation salts can be effected in any plastic system with which the salts are compatible. Plastic systems which can be used, for example, are the cellulose organic esters, such s cellulose acetate cellulose propionate, and cellulose acetatebutyrate; poly(alkylacrylates) and copolymers thereof, such as poly-methyl acrylate) and poly(methyl methacrylate); polycarbonates; poly(vinyl chloride); poly(vinyl alkanals); polystyrenes and poly(vinyl fluorides). The plastic systems may contain other additives, such as ultraviolet absorbers, dyes, or colorants, etc., depending on the properties desired in the final plastic product.

The plastic systems containing the monocation substituted tetraphenyl arylaminium salts prepared in situ by the above procedure may then be processed further by casting, molding, drawing into films, extruding, etc., to give useful products with desirable spectral characteristics.

One such type of useful plastic product is a welding window. Welding windows or plates are optical filters of glass or plastic containing additives which filter out ultraviolet, visible, and infrared radiation. Federal specifications for filter plates used in welding goggles, helmets, and shields are very precisely spelled out in Federal specifications GG–H–211b entitled "Helmet, Welder's and Shield, Welding, Hand-Held." In those specifications, requirements are graded depending on the intended end-use of the protective devices. The grades are designated by "shade numbers," the lower numbered shades allowing more transmission of infrared energy than grades with higher numbers. Grades 4 to 14 are used in welding goggles, helmets, and shields.

Infrared absorbers of the monocation substituted tetraphenyl arylaminium type are very useful in meeting the specifications for transmisison of infrared welding plates. Because of the difficulty in isolating the monocation salts of the higher homologs, these have not been used widely in the manufacture of welding windows as they might have been. Now, however, using the process of this invention, welding plates and other optical filters containing the higher homolog monocation tetraphenyl arylaminium salts are readily manufactured by adding the corresponding dication p-quinonediimonium salts and the corresponding unoxidized amines to the plastic formulas for these optical filters and allowing the subsequent reaction to form the desired monocation tetraphenyl arylaminium salt in situ. Welding windows cast from such formulations then exhibit the desired spectral characteristics and satisfy the specifications.

The invention is not limited to the preparation of monocation substituted tetraphenyl arylaminium type infrared absorbers in situ in plastic systems suitable for casting only. The salts may be formed in situ in any type of plastic system, such as those that are to be injection molded, drawn into films, extruded, etc.

The following example further illustrate this invention.

EXAMPLE 1

Preparation of bis(p-dipropylaminophenyl) [N,N-bis-(p-dipropylaminophenyl)-p-aminophenyl]aminium hexafluoroantimonate in solution A solution of $5 \times 10^{-5}$ moles of N,N,N',N'-tetrakis-(p-dipropylaminophenyl) - p - benzoquinonebis(imonium hexafluoroantimonate) in 1000 cc. acetone is prepared, and to this is added $5 \times 10^{-5}$ moles of N,N,N',N'-tetrakis (p-dipropylaminophenyl) - p-phenylenediamine. The solution thus obtained is allowed to stand for five minutes. An infrared absorption curve is read for the final solution on a Cary 14 Spectrophotometer which shows that the solution contains bis(p-dipropylaminophenyl)[N,N-bis-(p-dipropylaminophenyl)-p-aminophenyl[-aminium hexafluoroantimonate as the only solute.

EXAMPLE 2

Preparation of a cellulose acetate film containing bis(p-dibutylaminophenyl[N,N - bis(p - dibutylaminophenyl) p - aminophenyl] - aminium hexafluoroantimonate by solution casting A solution of 0.2951 part N,N,N',N'-tetrakis(p-dibutylaminophenyl) - p - benzoquinonebis(imonium hexafluoroantimonate) and of 0.20 part N,N,N',N'-tetrakis(p-dibutylaminophenyl)-p-phenylenediamine in 1000 parts acetone containing 100 parts cellulose acetate is prepared. After stirring for several minutes, it is drawn into films by solution casting, and the solvent is allowed to evaporate. Infrared absorption curves measured for the films thus obtained shown that the imonium salt and the polyamine are completely converted to bis(p-dibutylaminophenyl)[N,N - bis(p - dibutylaminophenyl) - p - aminophenyl]-aminium hexafluoroantimonate.

EXAMPLE 3

Preparation of a poly(methyl methacrylate) welding window

To one hundred parts by weight of methyl methacrylate is added the following (all parts are parts by weight).

| | Parts |
|---|---|
| N,N,N',N' - tetrakis(p - dibutylaminophenyl)-p-benzoquinone - bis(imonium hexafluoroantimonate) | 0.2951 |
| N,N,N',N' - tetrakis(p - dibutylaminophenyl) - p-phenylenediamine | 0.2 |
| Alizarine Cyanine Green (CI. 61565) | 0.0208 |
| Oil Red ZMQ (CI. 60505) | 0.0194 |
| 2,2' - dihydroxy-4-methoxybenzophenone | 0.2 |
| Azoisisobutyronitrile | 0.2 |

The mixture is stirred thoroughly. The resulting catalyzed mix is then deaerated with a nitrogen purge and degassed with a vacuum. The mix is then poured into cells and cast at 55° C. for 16 hours. A postcure of one hour at 100° C. is the final step. Measurement of the infrared absorption curves of the welding plates thus made shows the presence of bis(p - dibutylaminophenyl)[N,N-bis(p - dibutylaminophenyl)-p-aminophenyl]aminium hexafluoroantimonate and the absence of the bis(imonium hexafluoroantimonate) originally added. The plate thus prepared is a Shade 10.

EXAMPLE 4

Preparation of methyl methacrylate copolymer welding windows

The procedure of Example 3 is repeated except that mixtures of 85 parts by weight of methyl methacrylate with (a) 15 parts by weight of neopentyl glycol dimethacrylate or (b) with 15 parts by weight of polyethyleneglycol dimethacrylate are used in place of the 100 parts by weight of methyl methacrylate. Welding plates are thus made, which are Shade 10. Infrared absorption curves for these plates show that the bis-(imonium hexafluoroantimonate) has been converted to bis(p-dibutylaminophenyl)[N,N-bis(p-dibutylaminophenyl) - p - aminophenyl]-aminium hexafluoroantimonate.

I claim:

1. A method for preparing an aminium salt compound of the formula:

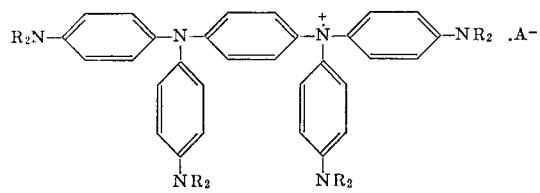

where R is an alkyl group of 3 to 8 carbon atoms and $A^-$ is an anion of an acid which comprises reacting, in a polymer system wherein said polymer is selected from the group consisting of cellulose esters, polycarbonates and polymers derived from an ethylenically unsaturated monomer, a diimonium salt of the formula:

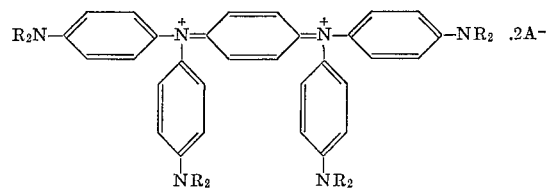

where R and $A^-$ have thhe same meanings as above, with a polyamine of the formula:

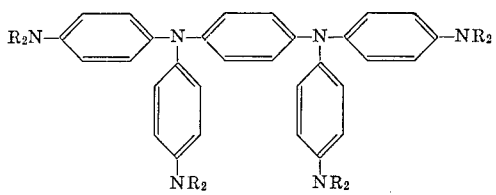

where R has the same meaning as above.

2. The method of claim 1 wherein substantially equimolar amounts of the diimonium salt and the polyamine are employed in the reaction.

3. The method of claim 1 wherein R in all instances is propyl.

4. The method of claim 1 above wherein R in all instances is butyl.

5. The method of claim 1 wherein $A^-$ in all instances is hexafluoroantimonate.

6. The method of claim 1 wherein R is butyl and $A^-$ is hexafluoroantimonate.

7. The method of claim 1 wherein the polymer system is a methacrylate polymer polymerization mixture.

References Cited
UNITED STATES PATENTS 3,484,467   12/1969   Susi et al.     260—440

DONALD E. CZAJA, Primary Examiner

U. P. HOKE, Assistant Examiner

U.S. Cl. X.R.

106—186 R; 252—300 R; 260—440, 446, 576